United States Patent
Auffret

(10) Patent No.: US 7,430,429 B2
(45) Date of Patent: Sep. 30, 2008

(54) DIVERSITY SYSTEM FOR MEASURING RECEPTION QUALITY

(75) Inventor: Eric Auffret, Noyal (FR)

(73) Assignee: Thomson Licensing, Boulogne-Billancourt (FR)

( * ) Notice: Subject to any disclaimer, the term of this patent is extended or adjusted under 35 U.S.C. 154(b) by 533 days.

(21) Appl. No.: 10/541,784

(22) PCT Filed: Dec. 22, 2003

(86) PCT No.: PCT/EP03/14734

§ 371 (c)(1),
(2), (4) Date: Jul. 11, 2005

(87) PCT Pub. No.: WO2004/064269

PCT Pub. Date: Jul. 29, 2004

(65) Prior Publication Data

US 2006/0141936 A1 Jun. 29, 2006

(30) Foreign Application Priority Data

Jan. 10, 2003 (FR) .................................. 03 00221

(51) Int. Cl.
*H04B 7/00* (2006.01)
(52) U.S. Cl. ............... 455/522; 455/67.11; 455/562.1; 370/334
(58) Field of Classification Search ............... 455/522
See application file for complete search history.

(56) References Cited

U.S. PATENT DOCUMENTS

| | | | | |
|---|---|---|---|---|
| 4,628,321 A | * | 12/1986 | Martin | 342/379 |
| 5,263,175 A | | 11/1993 | Dejmek | |
| 5,760,709 A | * | 6/1998 | Hayashi | 340/923 |
| 5,856,809 A | * | 1/1999 | Schoepfer | 343/703 |
| 5,940,454 A | * | 8/1999 | McNicol et al. | 375/347 |
| 6,002,672 A | * | 12/1999 | Todd | 370/252 |
| 6,118,773 A | * | 9/2000 | Todd | 370/334 |
| 6,587,686 B1 | * | 7/2003 | Cuffaro et al. | 455/423 |
| 6,654,590 B2 | * | 11/2003 | Boros et al. | 455/67.14 |
| 6,985,752 B2 | * | 1/2006 | Takano et al. | 455/522 |
| 7,002,939 B1 | * | 2/2006 | Hiramatsu | 370/335 |

(Continued)

FOREIGN PATENT DOCUMENTS

GB 2196211 4/1988

(Continued)

OTHER PUBLICATIONS

Search Report Dated Apr. 7, 2004.

*Primary Examiner*—Matthew Anderson
*Assistant Examiner*—Hai V Nguyen
(74) *Attorney, Agent, or Firm*—Joseph J. Laks; Robert D. Shedd; Brian J. Cromarty

(57) ABSTRACT

To assist an operator to position a wireless camera so that a base station receives with good quality a radiofrequency signal transmitted from a transmitter linked to the camera, several measurers linked to diversity receivers of the signal each determine whether a characteristic of the signal via the respective receiver satisfies a reception criterion. In the base station, a counter counts the receivers satisfying the reception criterion, and a divider establishes a reception quality indicator dependent on the number of satisfactory receivers so as in particular to retransmit it via a return channel to the camera so that it can be displayed thereon.

11 Claims, 4 Drawing Sheets

U.S. PATENT DOCUMENTS

| | | | |
|---|---|---|---|
| 7,099,630 B2 * | 8/2006 | Brunner et al. | 455/69 |
| 7,107,070 B2 * | 9/2006 | Auffret et al. | 455/556.1 |
| 7,110,795 B2 * | 9/2006 | Doi | 455/562.1 |
| 7,203,508 B2 * | 4/2007 | Ohkubo et al. | 455/510 |
| 7,277,679 B1 * | 10/2007 | Barratt et al. | 455/101 |
| 2001/0005685 A1 * | 6/2001 | Nishimori et al. | 455/562 |
| 2002/0042274 A1 * | 4/2002 | Ades | 455/445 |
| 2002/0173312 A1 * | 11/2002 | Takano et al. | 455/452 |
| 2003/0083070 A1 * | 5/2003 | Ishikawa et al. | 455/436 |
| 2003/0114114 A1 * | 6/2003 | Itoh | 455/69 |
| 2003/0228857 A1 * | 12/2003 | Maeki | 455/278.1 |
| 2004/0130488 A1 * | 7/2004 | De Champlain | 342/374 |
| 2004/0252632 A1 * | 12/2004 | Bourdoux et al. | 370/210 |
| 2005/0130690 A1 * | 6/2005 | Shinozaki | 455/522 |
| 2006/0084475 A1 * | 4/2006 | Ohkubo et al. | 455/562.1 |
| 2006/0234754 A1 * | 10/2006 | Takano et al. | 455/522 |
| 2007/0115881 A1 * | 5/2007 | Ohkubo et al. | 370/329 |
| 2007/0189191 A1 * | 8/2007 | Ades | 370/254 |
| 2008/0004078 A1 * | 1/2008 | Barratt et al. | 455/562.1 |

FOREIGN PATENT DOCUMENTS

| | | |
|---|---|---|
| GB | 2307375 | 5/1997 |

* cited by examiner

DIVERSITY SYSTEM FOR MEASURING RECEPTION QUALITY

This application claims the benefit, under 35 U.S.C. § 365 of International Application PCT/EP03/14734, filed Dec. 22, 2003, which was published in accordance with PCT Article 21(2) on Jul. 29, 2004 in English and which claims the benefit of French patent application No. 0300221, filed Jan. 10, 2003.

The present invention concerns a measurement system for measuring the quality of reception at the level of several radiofrequency receivers which receive a predetermined signal transmitted by a transmitter. The predetermined transmitted signal can be a single-carrier signal or a more complex signal, for example frequency or time division multiplexed.

The invention aims more particularly to use such a measurement system assisting an operator of a wireless mobile camera (cameraman) to position it properly to improve the transmission quality of the images and sounds transmitted by a camera-linked transmitter to central means of production (control room, outside broadcasting van), via the receivers.

To achieve this aim, a measurement system according to the invention for measuring the reception quality of a predetermined radiofrequency signal transmitted from a transmission means to several receiver means is characterized in that it comprises:

several measurement means respectively linked to the receiver means each to determine whether a characteristic of the predetermined signal received by the respective receiver means satisfies a predetermined reception criterion, a counting means to count a number of satisfactory receiver means in which the reception criterion is satisfied, and an indicator means to establish a reception quality indicator depending on the number of satisfactory receiver means.

Preferably, the counting means and the indicator means are included in a central measurement means linked to the receiver means.

The predetermined reception criterion is known by those skilled in the art and may, for example, be based on a comparison of the amplitude or power of the signal received by a receiver means, as a characteristic of the predetermined signal, with a predetermined threshold. The one of the receiver means offering the best reception in relation to the predetermined reception criterion will be selected in the central measurement means to retransmit the predetermined signal for example to a television control room when the predetermined signal is a video signal transmitted by the transmission means linked to a mobile wireless camera.

However, the invention does not directly concern the selection of the receiver means offering the best reception, but assistance to the cameraman directing the camera so that he positions the camera according to the reception quality indicator so that the said indicator is higher than the predetermined threshold.

As will be seen in what follows, the invention provides several variants of embodiment as concerns the transmission system comprising the reception means linked to the camera and the receiver means linked to the central measurement means. This system of transmission can operate in space diversity and/or frequency diversity and/or polarization diversity and/or time diversity.

Preferably, to better assist the cameraman near the camera, a return radio channel is provided over which the reception quality indicator is transmitted via a transmitter means included in the central measurement means to a reception means linked to the transmission means in order to display thereon the reception quality indicator.

According to a more complex embodiment, the receiver means are organized like a cellular telecommunications network. In this embodiment, several cellular receiver means each include several measurer means, a counting means and an indicator means in order to establish and transmit respective reception quality indicators to the central measurement means.

Other characteristics and advantages of the present invention will appear more clearly on reading the following description of several preferred embodiments of the invention with reference to the corresponding attached drawings in which.

Figure 1:
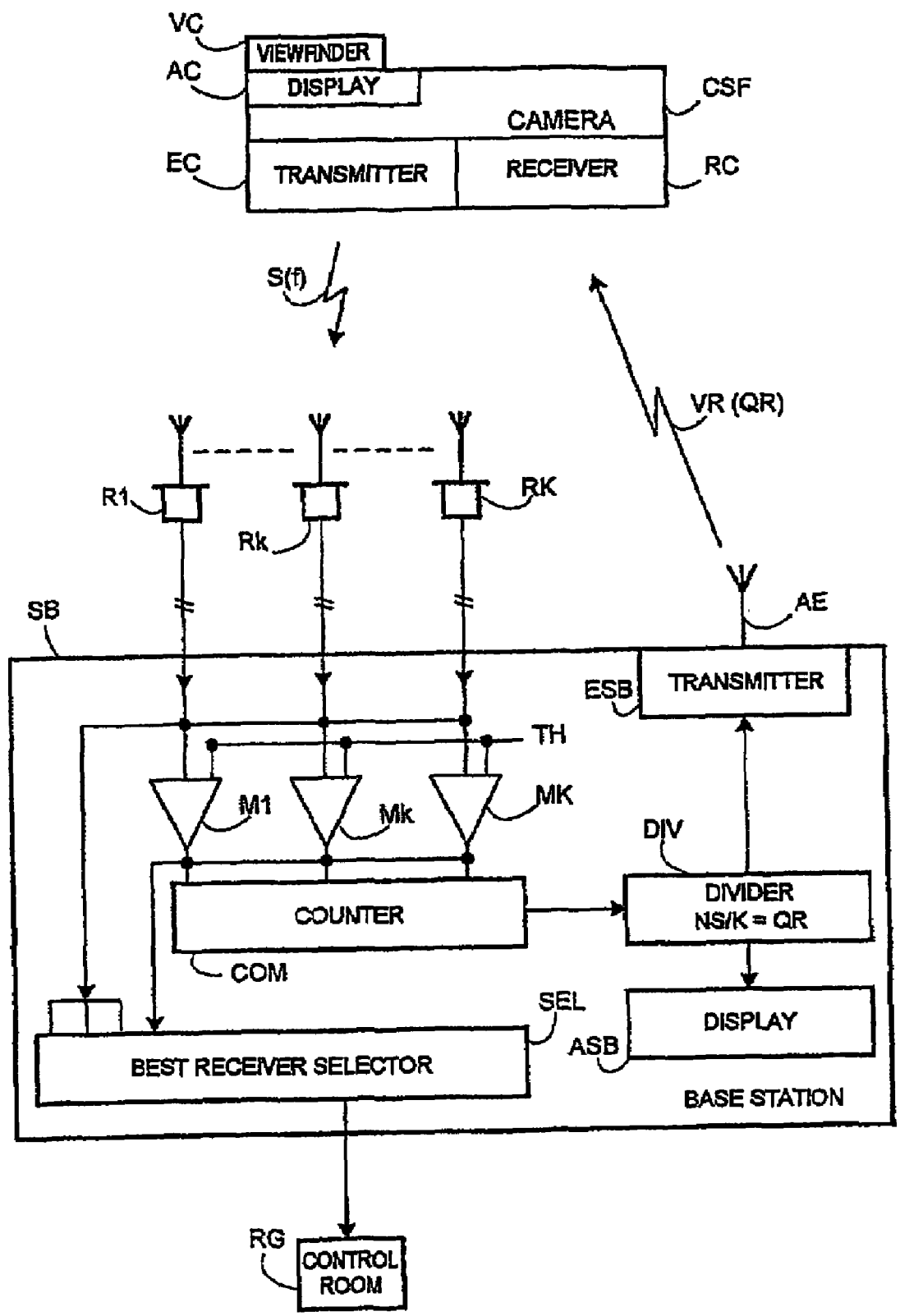
FIG. 1 is a block diagram of a measurement system according to a first embodiment of the invention, comprising a camera with a transmitter and with a receiver and a base station linked to distributed receivers.

With reference to FIG. 1, a reception quality measurement system according to the invention comprises a radiofrequency transmitter EC linked to a mobile wireless camera CSF, K elementary radiofrequency receivers R1 to RK and a base station SB constituting a central measurement means.

In this first embodiment illustrated in FIG. 1, the K elementary receivers R1 to RK operate in space diversity, that is a predetermined signal S(f) is transmitted at a predetermined frequency f by the transmitter EC and received by the receivers R1 to RK. The receivers R1 to RK are installed in different locations in order to have the disparity of the transmission channel between the transmitter EC and the receivers in three dimensional space. However, as a variant, the receivers Ra1 to RaK are concentrated in the base station Sba, as shown in FIG. 2.

Figure 2:
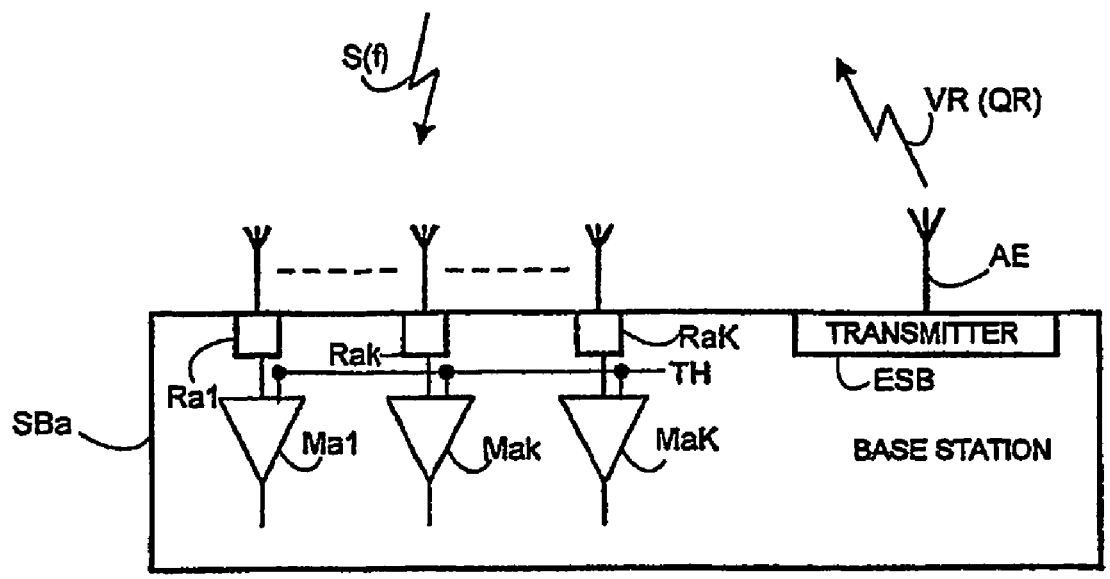
FIG. 2 is a block diagram of a base station similar to that in FIG. 1 but concentrating the receivers.

As shown in FIGS. 1 and 2 and in the subsequent figures, each elementary receiver Rk, where $2 \leq k \leq K$, is schematized by a reception antenna although the elementary receiver Rk comprises after the antenna various known respective means of processing the received signal to apply a baseband signal to the base station SB. When the receivers Ra1 to RaK are concentrated in the base station SBa, the K signal processing means in the receivers constitute K parallel reception channels, as is known.

The predetermined transmitted signal S(f) is for example a modulation signal on a carrier f which conveys a video image and sound signal (analogue or digital) produced by the camera CSF to, for example, a television control room RG via the base station SB.

In addition to the radio downlink between the transmitter EC and the receivers R1 to RK transmitting the signal Sf, the measurement system also comprises a return radio channel VR to transmit instructions and remote controls from the base station SB via a transmitter and transmission antenna AE of the latter to a radiofrequency receiver RC linked to the camera CSF. The instructions and remote controls are intended for an operator-cameraman handling the camera CSF and/or for the camera itself CSF. The return radio channel VR is used according to the invention also to transmit a reception quality indicator QR.

To evaluate the reception quality indicator QR, the base station SB comprises K measurers M1 to MK respectively linked to the output of the elementary receivers R1 to RK. Each measurer Mk, where $1 \leq k \leq K$, measures a predetermined characteristic of the signal received by the respective receiver Rk. The measurer Rk is included in the base station SB, as shown in FIGS. 1 and 2, or is integrated into the respective receiver Rk. For example, the predetermined characteristic that is measured in the measurer Mk is the amplitude or power of the signal received. The measurer Mk then comprises a comparator with a predetermined threshold TH. The output of the comparator is at a first logical state "1" indicating that the amplitude or the power received is greater than the threshold TH and at a second logical state "0" when the amplitude or the power received is below the threshold TH.

The base station SB also comprises a counter COM which counts the numbers NS of satisfactory elementary receivers of the K receivers, in which the reception criterion is satisfied, that is the amplitude or the power received is equal to or greater than the predetermined threshold TH. The number NS is equal to the number of outputs of the measurers M1 to MK at the state "1".

The base station SB comprises another divider DIV to establish the reception quality indicator QR depending on the number NS of satisfactory elementary receivers. In this instance, the indicator QR is equal to the ratio NS/K of the number of receivers in which the amplitude or power received is equal to or greater than the threshold TH over the total number K of receivers R1 to RK.

The number K of elementary receivers R1 to RK is equal to at least 2 and may be increased. It is chosen depending on the cost of the measurement system and the volume of the various equipment implemented in it.

For example, when the number K is equal to 3, the base station SB transmits an alarm when no receiver R1 to RK=R3 receives a signal of which the amplitude or the power is greater than the threshold TH. If one, two or three output logical signals from the measurers M1 to M3 are at the state "1", that is if one, two or three of the measurers M1 to M3 have processed signals with an amplitude or a power equal to or greater than the threshold TH, the reception quality indicator QR is equal to 33%, 66% or 100%. The base station SB then selects only the receiver that has satisfied the comparison criterion or selects one of the two or three receivers that have satisfied the comparison criterion to process the composite video signal received for retransmission for example to the television control room RG. In practice, one receiver of the K receivers R1 to RK that satisfies the predetermined reception criteria and presents the best reception, that is the highest level of amplitude or power, is determined by a best-receiver selector SEL.

The reception quality indicator QR established by the divider DIV is transmitted by the transmitter ESB and the transmission antenna AE of the base station SB via the return radio channel VR to the camera receiver RC. The indicator QR is indicated to the cameraman of the camera CSF on an external display AC dedicated to that indicator or directly in a viewfinder VC of the camera CSF. The reception quality indicator QR thus transmitted to the cameraman prompts him to move the camera CSF linked to the transmitter EC and to the receiver RC to find the camera position in which the displayed indicator value QR is the highest in order to optimize the reception quality in the base station SB and thus ensure transmission of the signal S(f) under the best conditions.

Preferably, the reception quality indicator QR is also communicated to an operator located in the base station SB by means of a display ASB for example of the LED diode, or electroluminescent bar or liquid crystal type.

The measurement system according to the invention is not restricted to space diversity reception, as shown in FIGS. 1 and 2, but can operate according to other modes of diversity shown below in FIGS. 3 to 5. For the purposes of simplification, the circuits COM, DIV, SEL and ASB found in all the base stations have not been shown.

Figure 3:
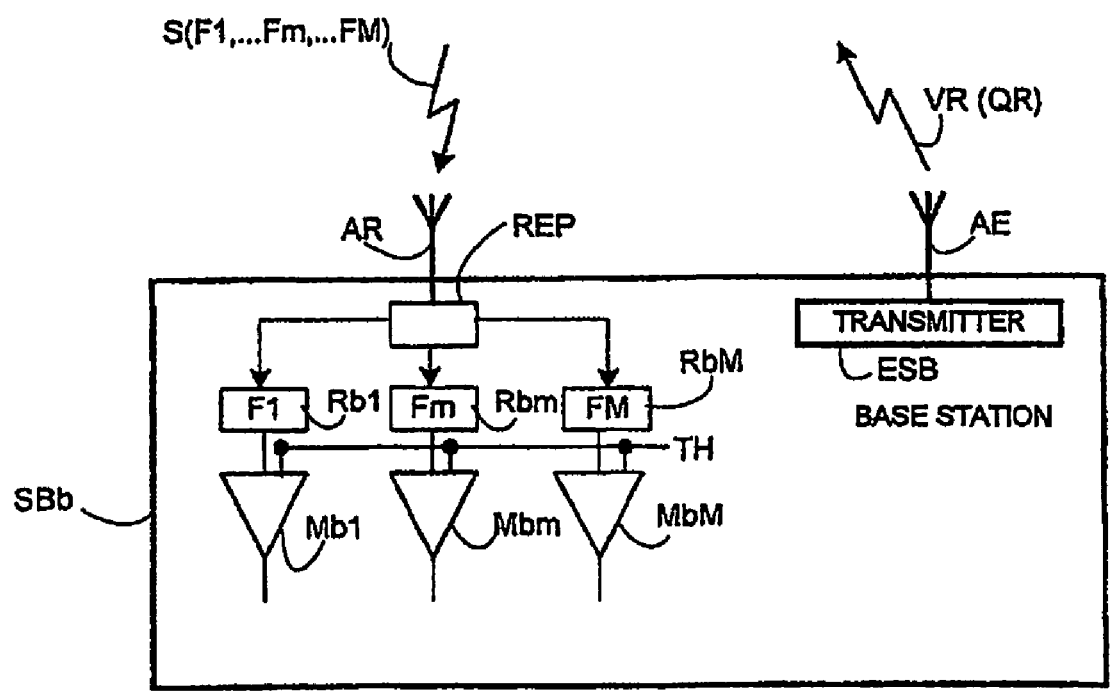
FIG. 3 is a block diagram of a frequency diversity base station according to a first variant.

According to a first variant shown in FIG. 3, the transmitter EC linked to the wireless camera CSF transmits a composite signal S composed of M signals supporting the same composite information of the video signal propagated on different carrier frequencies F1 to FM, where the integer $M \geq 2$, knowing that the behaviour of the transmission channel between the transmitter EC and the base station SBb can vary according to the carrier frequency. In this variant, the base station SBb comprises only one broadband reception antenna AR which is linked via a power distributor REP to M elementary receivers Rb1 to RbM filtering, demodulating and processing respectively the received signals with the carriers F1 to FM linked respectively to amplitude or power measurers Mb1 to MbM. The counting COM and divider DIV logic circuits are linked to the outputs of the measurers Mb1 to MbM to evaluate the reception quality indicator QR, as in FIGS. 1 and 2. The reception quality indicator QR is expressed in this variant according to the number of carriers satisfying the predetermined reception criterion. Also a selector SEL linked to the outputs of the receivers Rb1 to RbM selects the carrier presenting the best reception quality.

Figure 4:
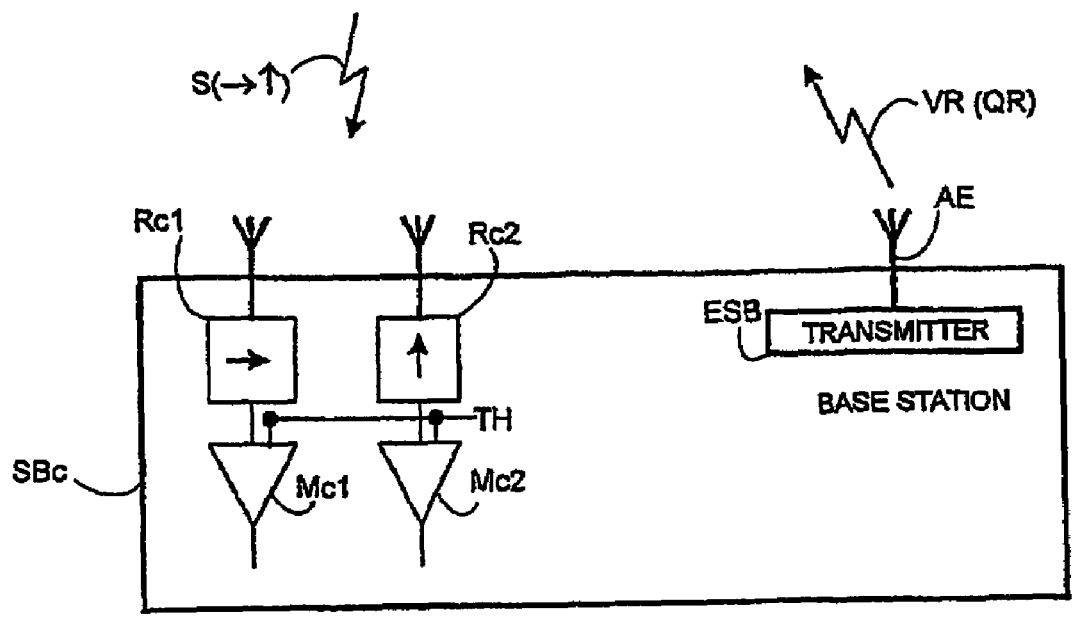
FIG. 4 is a block diagram of a polarization diversity base station according to a second variant.

According to a second variant shown in FIG. 4, the transmitter EC linked to the camera CSF transmits the composite video signal Sf according to two orthogonal polarizations of the electric field, this requiring two elementary receivers Rc1 and Rc2, where necessary with two distinct reception antennae in the base station SBc. The base station SBc also comprises two measurers Mc1 and Mc2 at the outputs of the receivers Rc1 and Rc2, linked to the COM-DIV circuit and to the selector SEL. More generally in this variant, the base station SBc may comprise more than two receivers designed to receive respectively several signals transmitted with the same information by the transmitter EC, but according to different polarizations of the electric field, respectively.

Figure 5:
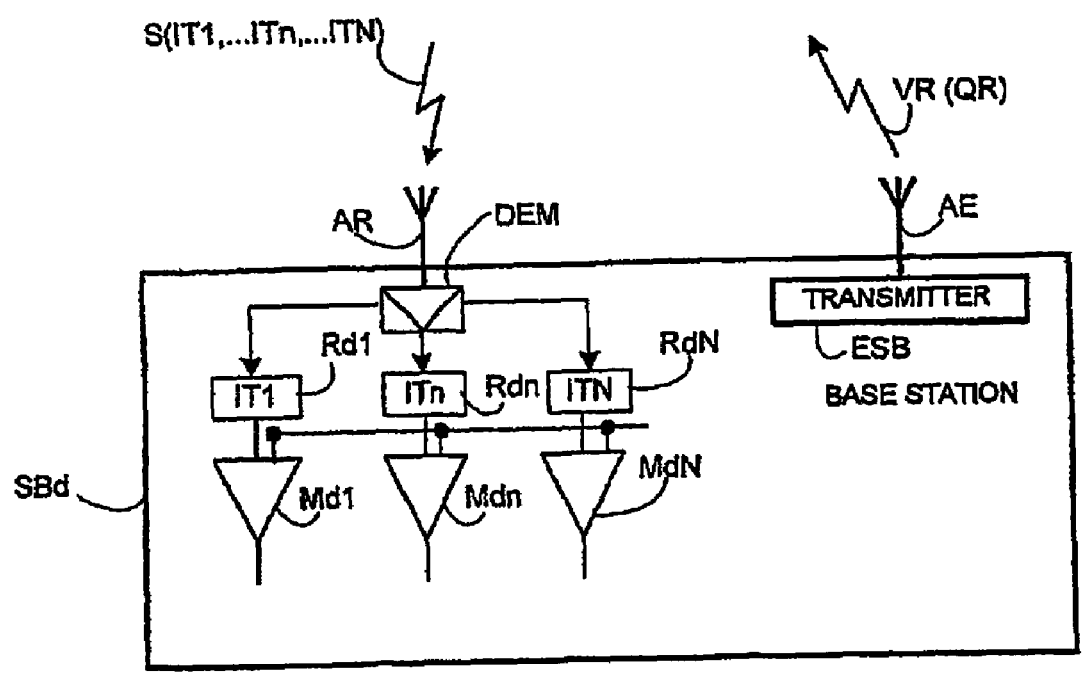
FIG. 5 is a block diagram of a time diversity base station according to a third variant.
Figure 6:
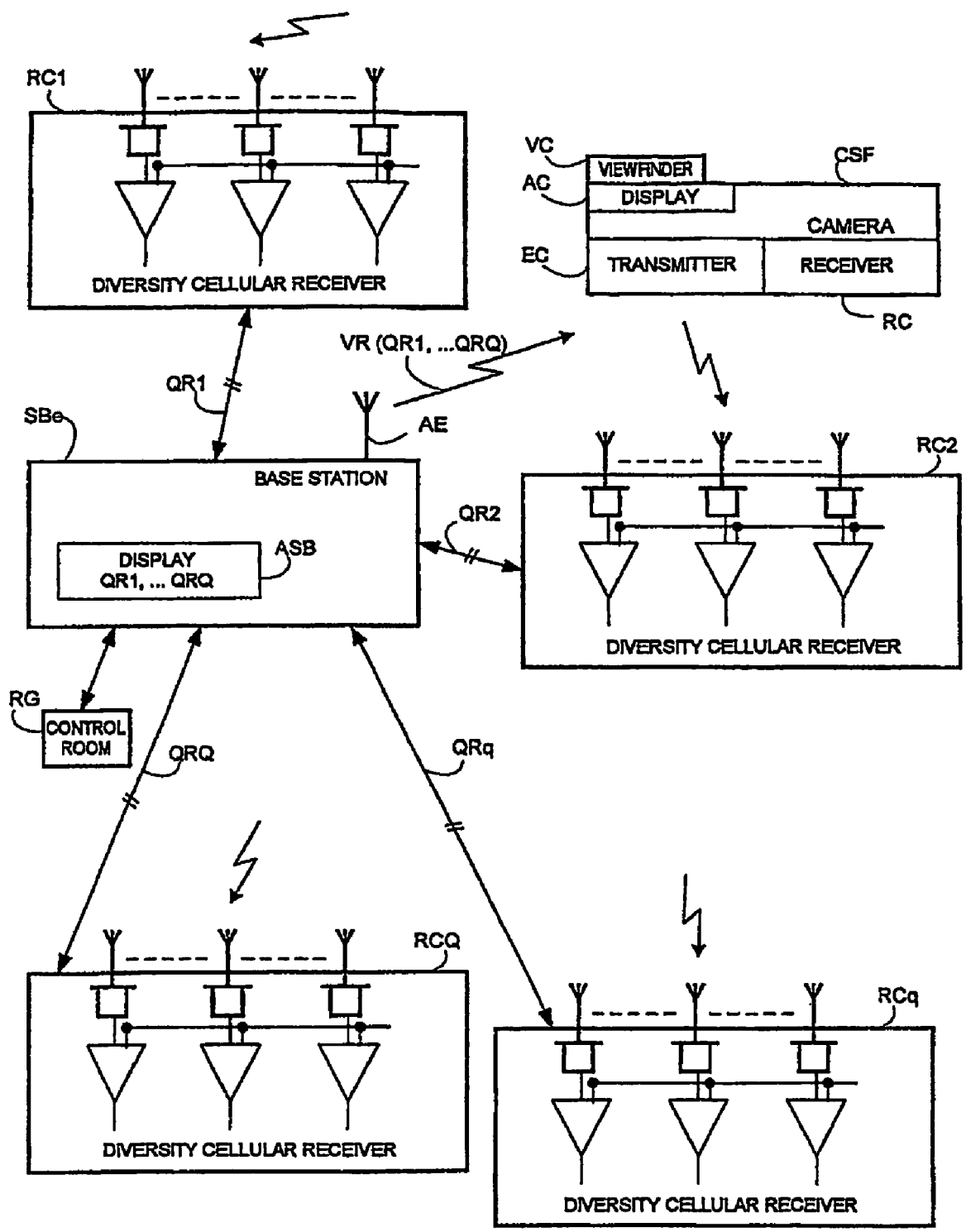
FIG. 6 is a block diagram of a base station with cellular receivers distributed in elementary cells.

According to a third variant shown in FIG. 5, the transmitter EC linked to the camera CSF transmits the same signal several times at different instants. For example, the transmitter EC transmits the signal S representative of one or more samples of the video signal to be transmitted repetitively in N consecutive time slots IT1 to ITN, where $N \geq 2$. The set of N slots is, for example, signalled by a synchronization slot preceding them. All the successive signals transmitted during the slots IT1 to ITN are received by a single antenna AR in the base station SBd and are demultiplexed in a demultiplexer DEM so as to be processed in N elementary receivers Rd1 to RdN linked respectively to amplitude or power measurers Md1 to MdN. The transmission of the same signal S at different instants makes it possible to take advantage of the behaviour of the transmission channel varying over time between the transmitter EC and the base station SBd. So that the counter COM at the output of the measurers Md1 to MdN and the best-receiver selector SEL at the output of the receivers Rd1 to RdN are able to process the signals output from the measurers and receivers in synchronism, the signals received in the slots IT1 to ITN are delayed respectively by N−1 to 0 time slot durations respectively, for example by means of delay circuits or appropriate memories.

The different variants presented above of the measurement system can be combined. The base station can process signals transmitted by the transmitter EC in space diversity and/or frequency diversity and/or polarization diversity and/or time diversity.

According to another preferred embodiment of the invention, the measurement system on the base station SBe side is much more extensive in order to ensure greater mobility of the wireless camera CSF. The base station SBe is linked to Q diversity cellular receivers RC1 to RCQ, where Q≧2. As is known in a digital cellular network for mobile radio telephones, each cellular receiver RCq, where 1≦q≦Q, is particular to receiving signals at a respective carrier frequency Fq. For this respective frequency Fq, the elementary receiver RCq can operate, like the base station shown in FIGS. 1 to 5, in space diversity and/or frequency diversity and/or polarization diversity and/or time diversity. The receiver RCq comprises in consequence several diversity receivers, amplitude or power measurers, the counter COM and the divider DIV according to the variants described above.

In this embodiment, a best-receiver selector in the base station SBe chooses the best cell, that is the best receiver RC1 to RCQ of which the selector SEL retransmits the best signal received, according to a predetermined criterion similar to those according to the variants illustrated in FIGS. 1 to 5. The quality indicators QR1 to QRQ produced by the divider DIV in the cellular receivers RC1 to RCQ are transmitted to the base station SBe whose transmitter ASB retransmits them to the receiver RC of the camera over the return radio channel VR. In the display ASB in the base station Sbe and/or in the display AC linked to the camera CSF, the reception quality indicators QR1 to QRQ are presented in association with index numbers 1 to Q of the respective cells. Particularly in the base station SBe, the indicators QR1 to QRQ are displayed on a map substantially in the locations where the cellular receivers RC1 to RCQ are found. Such a map superimposing the reception quality indicators QR1 to QRQ with the locations of the receivers RC1 to RCQ respectively indicated by their index numbers 1 to Q can be displayed advantageously by means of the screen of a computer of the PC type.

This display presents the following advantages:
- the cameraman can have complete autonomy to manage the positioning of the camera CSF, within a cell or on the boundary of two or more cells, to optimize the quality of transmission without the help of another operator supervising the transmission at the base station;
- it enables the cameraman to locate himself in relation to the system's cellular receivers and to its particular topology; furthermore, an operator situated at the base station SBe or in the television control room RG can easily locate the cameraman in relation to RC1 to RCQ;
- when the camera CSF is situated substantially at the boundary between two cells, the operator can choose the cell offering the best reception quality by requesting that the camera be moved to that cell.

The invention claimed is:

1. Measurement system for measuring the reception quality of a predetermined radiofrequency signal transmitted from a transmission means to several receiver means comprising:
   several measurer means respectively linked to the receiver means each to determine whether a characteristic of the predetermined radiofrequency signal received by the respective receiver means satisfies a predetermined reception criterion,
   a counting means to count a number of satisfactory receiver means in which the reception criterion is satisfied, and
   an indicator means to establish a reception quality indicator depending on the number of satisfactory receiver means.

2. Measurement system according to claim 1, in which the counting means and the indicator means are included in a central measurement means linked to the receiver means.

3. Measurement system according to claim 2, in which a display of the measurement means displays the reception quality indicator.

4. Measurement system according to claim 1, in which the transmission means and the receiver means operate in space diversity or in frequency diversity or in polarization diversity or in time diversity.

5. Measurement system according to claim 1, comprising a return radio channel over which the reception quality indicator is transmitted via a transmitter means to a reception means linked to the transmission means in order to display thereon the reception quality indicator.

6. Measurement system according to claim 5, in which the reception quality indicators are retransmitted over the return radio channel front the transmitter means to the receiver means.

7. Measurement system according to claim 5, comprising several cellular receiver means each including several measurer means, a counting means and an indicator means in order to establish and transmit respective reception quality indicators to the central measurement means, in which the reception quality indicators are retransmitted over the return radio channel from the transmitter means to the receiver means.

8. Measurement system according to claim 1, comprising several cellular receiver means each including several measurer means, a counting means and an indicator means in order to establish and transmit respective reception quality indicators to the central measurement means.

9. Measurement system according to claim 8, in which the reception quality indicators are displayed in the base station.

10. Measurement system according to claim 9, in which the reception quality indicators are displayed on a map respectively in correspondence with the locations of the cellular receiver means on the map.

11. Measurement system according to claim 1, in which the transmission means is linked to a mobile wireless camera.

* * * * *